Jan. 30, 1934.  J. D. BRADFORD ET AL  1,944,963
MATERIAL SAMPLING SYSTEM
Filed Jan. 31, 1931  2 Sheets-Sheet 1
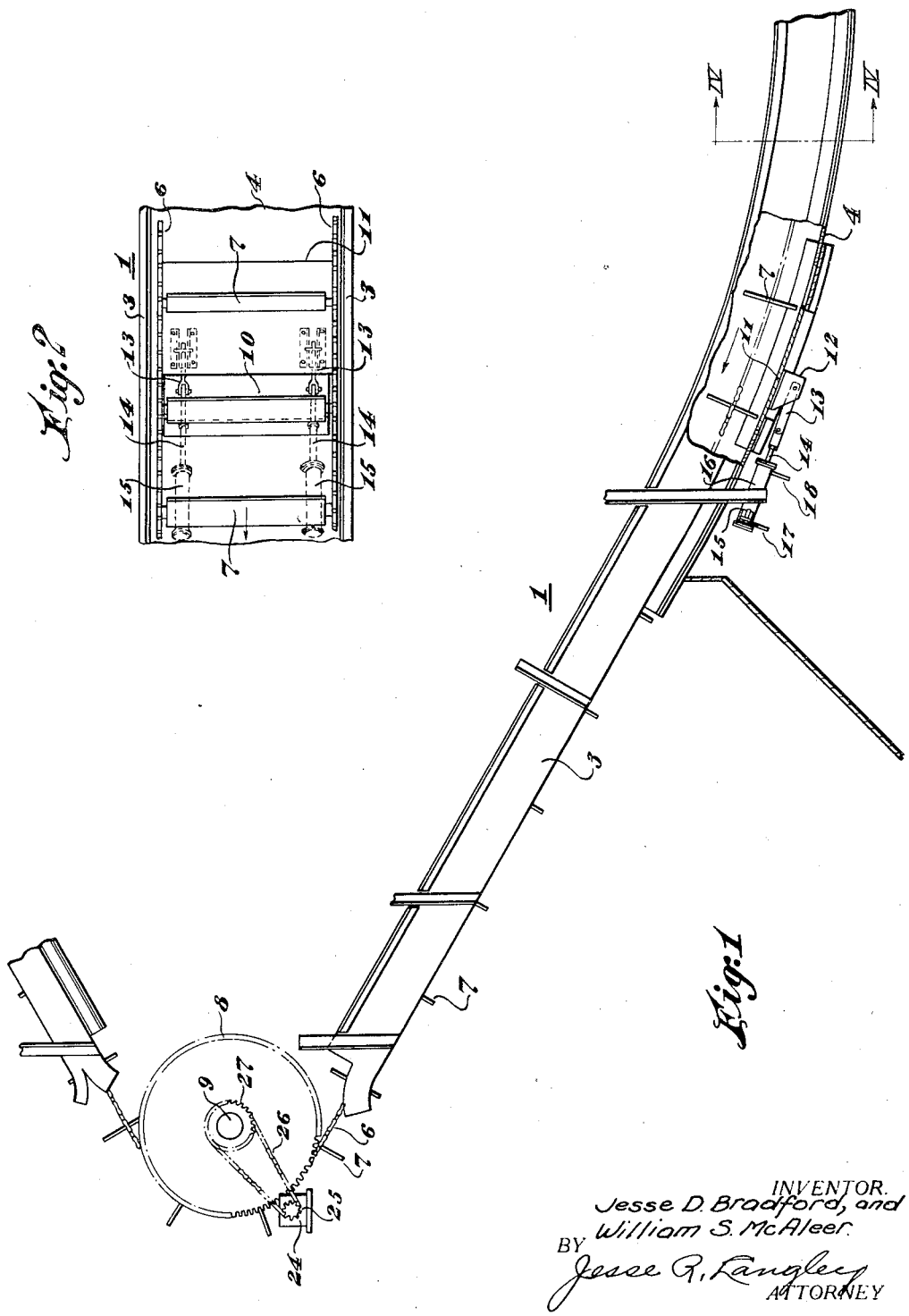
INVENTOR.
Jesse D. Bradford, and
William S. McAleer.
BY Jesse R. Langley
ATTORNEY Jan. 30, 1934.    J. D. BRADFORD ET AL    1,944,963
MATERIAL SAMPLING SYSTEM
Filed Jan. 31, 1931    2 Sheets-Sheet 2
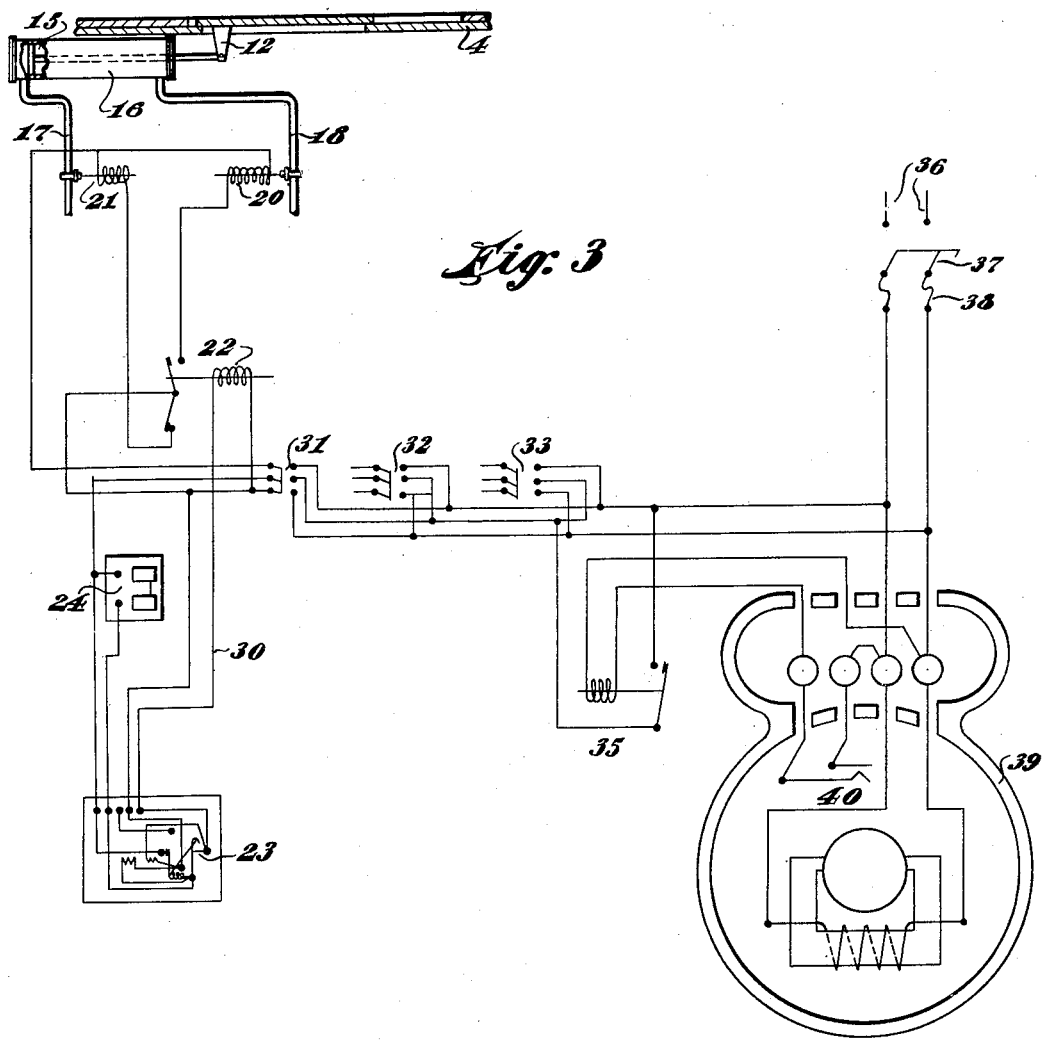
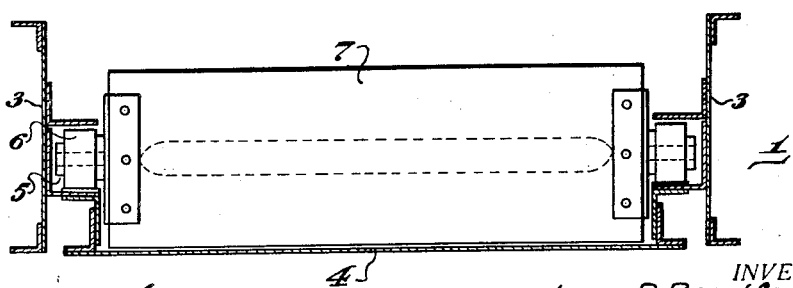
INVENTOR.
Jesse D. Bradford and
William S. McAleer.
BY Jesse R. Langley
ATTORNEY.

Patented Jan. 30, 1934

1,944,963

UNITED STATES PATENT OFFICE 1,944,963

MATERIAL SAMPLING SYSTEM

Jesse D. Bradford, Edgewood, and William S. McAleer, Bellevue, Pa., assignors to The Koppers Company of Delaware, a corporation of Delaware Application January 31, 1931. Serial No. 512,592

5 Claims. (Cl. 73—21)

This invention relates to material handling systems, and more particularly to a system of this character adapted for use in a handling system for material such as coal, coke, stone, and the like.

In installations in which flight conveyors are employed for handling the material, it is desirable to obtain a sample of the material between two adjacent flights, without stopping the operation of the conveyor.

It is therefore an object of the present invention to provide a sampling gate which will remove all of the material between two adjacent flights, without taking any material from between other flights of the conveyor.

Another object is to provide a sampling system which will obtain samples of material being handled by a plurality of conveyors, in such a manner that a sample is taken from each conveyor at predetermined intervals of time.

Other objects and features of novelty will be apparent as the following description proceeds, reference being had to the accompanying drawings, in which Figure 1 is an elevation of one type of flight conveyor, showing the sampling gate according to the present invention in closed position, parts of the conveyor being broken away in order to show internal details;

Fig. 2 is a plan view of a portion of the structure shown in Fig. 1, but showing the sampling gate in open position;

Fig. 3 is a wiring diagram for the sampling system according to the present invention; and Fig. 4 is a vertical section taken along the line IV—IV of Fig. 1.

Referring more particularly to the drawings, a conveyor 1 is illustrated in Figs. 1, 2 and 4, it being understood that the details of this conveyor are employed in an illustrative and not in a limiting sense, inasmuch as the invention is equally applicable to all types of flight conveyors.

The conveyor 1 comprises a trough having side members 3 and a bottom plate 4. The side members 3 are provided with channels 5 which receive conveyor chains 6. The chains 6 carry therebetween a plurality of flights 7. This construction is such that the flights 7 are maintained normal to the bottom plate 4, and extend entirely across the trough so as to insure that all of the material in the trough is propelled therealong.

The chains 6 pass over sprockets 8 carried by a shaft 9, and, depending upon the installation, the power for driving the chains may be applied to the shaft 9, or may be applied to some other shaft not shown, carrying sprockets over which the chain 6 passes.

The bottom plate 4 of the conveyor trough is provided with a sampling aperture 10. This aperture is opened and closed by a sampling gate, which comprises merely a movable plate 11 of substantially the same contour as the bottom plate 4, and is movable with respect thereto so as to open and close the aperture 10.

In the form shown, the plate 11 is slidable longitudinally of the bottom plate 4, and is preferably of a length greater than the distance between flights 7 of the conveyor. This length of the plate 11 is desirable in order to obtain a true sample comprising all of the coal between adjacent flights of the conveyor.

With a shorter plate, the sample would be contaminated by an accumulation of coal from between a large number of preceding flights. The thickness of the plate would form an obstruction which would accumulate a layer of material from the preceding flights, which layer would be removed with the sample from between the two flights chosen for the sampling step.

The under side of the plate 11 carries brackets 12 which form pivotal connections for links 13. The links 13 are connected to piston rods 14 for pistons 15 operating in cylinders 16 conveniently mounted adjacent the sampling opening in the conveyor trough.

Fluid-pressure supply pipes 17 and 18 are connected to the respective ends of the cylinders 16. Preferably, compressed air is supplied to these pipes for pneumatic operation of the sample gate.

Electromagnetic valves 20 and 21 are provided for controlling the pipes 17 and 18. The magnets of these valves are connected in circuit with a double-throw magnet switch 22 which provides for alternate operation of these valves. Current is supplied to the valves through the switch 22 by means of a definite time relay 23. The circuit for the relay 23 is, in turn, controlled by a drum switch 24 which is interposed in the circuit between the relay and the feeder therefor.

The drive for the drum switch 24 is shown in Fig. 1. The shaft of this switch 24 carries a sprocket 25 which is connected by a sprocket chain 26 to a sprocket 27 keyed to the shaft 9. In this manner, the operation of the drum switch 24 is synchronized with the operation of the chain 6.

With the timing arrangements described above, the sampling gate is opened when the front flight 7 of the pair between which the sample to be taken lies, passes over the plate 11 and reaches the rear edge of the opening 10. The gate is closed when the rear flight of the pair being sampled passes over the front edge of the plate 11.

The feeders 30 for the time relay 23 are connected to a switch 31, as shown in Fig. 3. Similar switches 32 and 33 are illustrated in Fig. 3 and each of these switches is provided with electrical connections such as described for the switch 31, the details being omitted to avoid duplication thereof.

The switches 31, 32 and 33 are connected in parallel so as to receive current through a magnet switch 35, the contacts of which, when closed, supply the current for operating the respective sampling gates through the described synchronizing electrical connections. Thus, the system may operate one or more sampling gates for one or more different conveyors, which may be of the type illustrated in Fig. 1, or of entirely different types, three switches being shown for operation of three sampling gates for three conveyors by way of example.

Power is supplied to the system by lines 36 through a master switch 37 and fuses 38 to an automatic contact repeater 39, which makes contact at definite time intervals or multiples thereof according to the setting of the timer. This repeater includes contacts 40 which are held closed for the predetermined interval of time to which the timer is set. Closing of the contacts 40 energizes the magnet switch 35 which closes to supply current to the feeders for all of the timers 23, which are respectively associated with the sampling gates in the system.

In operation, the automatic contact repeater 39 is connected to the line as described, and is set for the desired time interval of contact, and the desired period between contacts. When the contact period occurs, the repeater 39 serves to close the contacts 40 and energizes the magnet switch 35 so that the feeders for the time relays 23 are all connected to the power circuit.

However, the current for the relay 23 associated with each sampling gate passes through the rotating drum switch 24 which is driven in timed relation with the associated conveyor. This arrangement insures that even though the repeater 39 has energized the circuit, the relay will not operate until the relay is synchronized with the flights of the conveyor which it is intended to sample.

As soon as the relay 23 is synchronized with the conveyor flights by the action of the corresponding drum switch 24, the relay is energized and operates the switch 22, causing it to take the position shown in Fig. 3. This action will energize the magnet valve 21 without energizing the valve 20.

Accordingly, fluid under pressure will be supplied to the outer end of the cylinders 16 which will force the pistons 15 toward the inner ends of the cylinders. This action, through the rods 14, links 13 and brackets 12, will cause the plate 11 to move along the bottom of the trough, thus opening the aperture 10 of the sampling gate.

The relay 23 is so constructed that the gate is held open only for a predetermined interval of time, after which the relay functions to immediately close the gate, by reversing the operation of the switch 22, to de-energize the magnet valve 21 and energize the magnet valve 20. Accordingly, fluid under pressure will be supplied to the inner end of the cylinders 16 and thus cause the pistons 15 to make the return stroke, thus closing the sampling gate.

While one embodiment of the invention has been illustrated and described in such detail as to enable anyone skilled in the art to practice the invention, nevertheless it will be understood that the invention is not to be limited to any of the details disclosed, other than as necessitated by the development of the prior art. Instead, it will be appreciated that the invention embraces such embodiments of the broad idea as fall within the scope of the appended claims.

We claim as our invention:

1. In combination with a conveyor comprising a trough, and flights in said trough, said trough having a sampling aperture therein, a longitudinally sliding gate for said aperture, automatic means adapted for operation in timed relation to the movement of said flights for opening said gate as the front flight of a pair of adjacent flights passes the front edge of said aperture and for closing said gate as the rear flight reaches the front edge of said gate.

2. In combination with a flight conveyor, a sampling gate, a device for operating said gate, electromagnetic control means for said device, a time relay, means for controlling said control, means connected to and operating in timed relation to the operation of said conveyor for periodically energizing said time relay means and thereby causing said electromagnetic control means to open said gate, maintain said gate open for a predetermined time interval, and then close said gate.

3. In combination with a flight conveyor, a sampling gate, a device for operating said gate, electromagnetic control means for said device, a time relay means operatively connected to and adapted to actuate said electromagnetic control means, a switch means connected to said conveyor so as to be operated in timed relation therewith for periodically energizing said time relay and thereby causing said electromagnetic control means to open said gate for a predetermined itme interval, and then close said gate, and a repeater means for supplying current to said switch.

4. Apparatus of the character described, comprising in combination, a conveyor having a sampling gate, a fluid pressure device for operating said gate, electromagnetic valves for said fluid pressure device, a time relay means operatively connected to and adapted to actuate said electromagnetic valves, a drum switch means connected to and conveyor so as to be driven in timed relation therewith for energizing said relay, and a repeater means for periodically energizing said drum switch.

5. In combination with a conveyor comprising a trough, and flights in said trough, said trough having a sampling aperture therein, a longitudinally sliding gate for said aperture, means for opening said gate as the front flight of a pair of adjacent flights passes the front edge of said aperture, means for closing said gate as the rear flight reaches the front edge of said gate, and means operatively connected to and operating in timed relation to the movement of said flights for controlling the opening and the closing means for said gate.

JESSE D. BRADFORD.
WILLIAM S. McALEER.